United States Patent [19]
Cong et al.

[11] Patent Number: 6,070,136
[45] Date of Patent: *May 30, 2000

[54] MATRIX QUANTIZATION WITH VECTOR QUANTIZATION ERROR COMPENSATION FOR ROBUST SPEECH RECOGNITION

[75] Inventors: Lin Cong; Safdar M. Asghar, both of Austin, Tex.

[73] Assignee: Advanced Micro Devices, Inc., Sunnyvale, Calif.

[*] Notice: This patent is subject to a terminal disclaimer.

[21] Appl. No.: 08/957,902

[22] Filed: Oct. 27, 1997

[51] Int. Cl.$^7$ ............................ H04B 1/66; G10L 1/00
[52] U.S. Cl. ..................... 704/222; 704/256; 704/243; 704/251
[58] Field of Search ................... 704/222, 256, 704/243, 251

[56] References Cited

U.S. PATENT DOCUMENTS

| | | | |
|---|---|---|---|
| 4,383,135 | 5/1983 | Scott et al. | 179/1 SD |
| 4,519,094 | 5/1985 | Brown et al. | 381/43 |
| 4,933,973 | 6/1990 | Porter | 381/43 |
| 4,975,955 | 12/1990 | Taguchi | 381/36 |
| 5,031,217 | 7/1991 | Nishimura | 381/43 |
| 5,046,099 | 9/1991 | Nishimura | 381/43 |
| 5,185,848 | 2/1993 | Aritsuka et al. | 395/2 |
| 5,228,087 | 7/1993 | Bickerton | 381/43 |
| 5,255,339 | 10/1993 | Fette et al. | 395/2 |
| 5,285,522 | 2/1994 | Mueller | 395/2.41 |
| 5,313,555 | 5/1994 | Kamiya | 395/2.42 |
| 5,414,796 | 5/1995 | Jacobs et al. | 395/2.3 |
| 5,583,888 | 12/1996 | Ono | 375/240 |
| 5,596,679 | 1/1997 | Wang | 395/2.45 |
| 5,625,747 | 4/1997 | Goldberg et al. | 395/2.52 |
| 5,696,878 | 12/1997 | Ono et al. | 395/2.59 |
| 5,734,793 | 3/1998 | Wang | 395/2.41 |

OTHER PUBLICATIONS

Lin Cong "A Study Of Robust IWSR Systems", May 1996.
Lin Cong "Robust Speech Recognition In A Car Environment", Jun. 1995.

Lawrence Rabiner and Biing–Hwang Juang, "Fundamentals of Speech Recognition," Prentice Hall PTR (Englewood Cliffs, New Jersey, 1993), pp. 190–195.

Cong, Lin; "A Study of Robust IWSR Systems"; PhD Thesis submitted to The University of Manchester School of Engineering, Division of Electrical Engineering; Manchester, United Kingdom; pp. 1–209., May 1996.

Waibel, Alexander; "Neural Network Approaches for Speech Recognition"; Chapter 18 of *Advances in Speech Signal Processing*; edited by Sadaoki Furui and M. Mohan Sondhi; Marcel Dekker, Inc.; New York, New York; 1992; pp. 555–595.

(List continued on next page.)

*Primary Examiner*—David R. Hudspeth
*Assistant Examiner*—Daniel Abebe
*Attorney, Agent, or Firm*—Skjerven, Morrill, MacPherson, Franklin & Friel, LLP; Kent B. Chambers

[57] ABSTRACT

A speech recognition system utilizes both matrix and vector quantizers as front ends to a second stage speech classifier. Matrix quantization exploits input signal information in both frequency and time domains, and the vector quantizer primarily operates on frequency domain information. However, in some circumstances, time domain information may be substantially limited which may introduce error into the matrix quantization. Information derived from vector quantization may be utilized by a hybrid decision generator to error compensate information derived from matrix quantization. Additionally, fuzz methods of quantization and robust distance measures may be introduced to also enhance speech recognition accuracy. Furthermore, other speech classification stages may be used, such as hidden Markov models which introduce probabilistic processes to further enhance speech recognition accuracy. Multiple codebooks may also be combined to form single respective codebooks for matrix and vector quantization to lessen the demand on processing resources.

44 Claims, 2 Drawing Sheets

OTHER PUBLICATIONS

Xydeas, C. S. and Cong, L.; "Combining Neural Network Classification with Fuzzy Vector Quantization and Hidden Markov Models for Robust Isolated Word Speech Recognition"; *Signal Processing VIII Theories and Applications*, vol. III; Proceedings of the IEEE International Symposium on Information Theory, IEEE Press, 1995, p. 174.

Xydeas, C. S. and Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conferences, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook*; Editor–in–Chief Richard C. Dorf; ©1993 by CRC Press, Inc.; pp. 279–314.

Gersho, Allen and Shihua Wang; "Vector Qunatization Techniques in Speech Coding"; Chapter 2 of *Advances in Speech Signal Processing*; edited by Sadaoki Furui and M. Mohan Sondhi; Marcel Dekker Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing*; edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing*; edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing*; edited by Sadaoki Furui and M. Mohan Sondhi; Marcel Dekker, Inc.; New York, New York; 1992; pp. 231–268.

Cong, Ling, Xydeas, Costas S. Prof and Ferwood, Anthony F. Combining Fuzzy Vector Quantization and Neural Network Classification for Robust Isolated Word Speech Recognition: Singapore ICCS 1994, pp. 884–887.

Xydeas, C.S. Prof. and Cong, Lin "Robust Speech Recognition Using Fuzzy Martix Quantisation, Neural Networks and Hidden Markov Models" Sep. 1996, pp. 1587–1590.

Xydeas, C.S. and Lin Cong; "Robust Speech Recognition Using Fuzzy Matrix Quantization and Neural Networks"; Proceedings of International Conference on Communication Technology; Beijing, China—ICCT '96; pp. 432–435; IEEE; New York (May 5–7, 1996).

Parsons, Thomas W.; "Voice and Speech Processing"; McGraw–Hill, Inc., New York, 1987; pp. 170–171.

MATRIX QUANTIZATION WITH VECTOR QUANTIZATION ERROR COMPENSATION FOR ROBUST SPEECH RECOGNITION

BACKGROUND OF THE INVENTION

1. Field of the Invention

This invention relates to speech recognition and more particularly relates to combining matrix and vector quantization to provide robust speech recognition.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the input signal 101 with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

FIG. 1 generally characterizes a speech recognition process by the speech recognition system 100. A microphone transducer 102 picks up an input signal 101 and provides to signal preprocessor 104 an electronic signal representation of the composite input signal 101. The input signal 101 is an acoustic waveform of a spoken input, typically a word, or a connecting string of words. The signal preprocessor 104 may, for example, filter the input signal 101, and a feature extractor 106 extracts selected information from the input signal 101 to characterize the signal with, for example, cepstral frequencies or line spectral pair frequencies (LSPs).

Referring to FIG. 2, more specifically, feature extraction in operation 106 is basically a data-reduction technique whereby a large number of data points (in this case samples of the input signal 101 recorded at an appropriate sampling rate) are transformed into a smaller set of features which are "equivalent", in the sense that they faithfully describe the salient properties of the input signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds (ms). Thus, short-time input signal 101 portion of input signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates an input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 ms, to represent the changing vocal tract. LP prediction coefficients are calculated using a variety of well-known procedures, such as autocorrelation and covariance procedures, to minimize the difference between the actual input signal 101 and a predicted input signal 101 often stored as a spectral envelope reference pattern. The LP prediction coefficients can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted information to classify the represented input signal 101 to a database of representative input signal 101. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing input signal 01 are segmented into short-term input signal 101 frames and considered to be stationary within each frame for 10 to 30 msec duration. The extracted features may be represented by a P-dimensional vector and compared with predetermined, stored reference patterns 208 by the pattern similarity operation 210. Similarity between the input signal 101 pattern and the stored reference patterns 208 is determined in pattern similarity operation 210 using well-known vector quantization processes. The vector quantization process yields spectral distortion or distance measures to quantify the score of fitness or closeness between the representation of input signal 101 and each of the stored reference patterns 208.

The decision rule operation 212 receives the distance measures and determines which of the reference patterns 208 the input signal 101 most closely represents. In a "hard" decision making process, input signal 101 is matched to one of the reference patterns 208. This one-to-one "hard decision" ignores the relationship of the input signal 101 to all the other reference patterns 208. Fuzzy methods have been introduced to provide a better match between vector quantized frames of input signal 101 and reference patterns 208. In a "soft" or "fuzzy" decision making process, input signal 101 is related to one or more reference patterns 208 by weighting coefficients.

Matrix quantization has also been used to introduce temporal information about input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of input signal 101.

Despite conventional speech recognition progress, research and developement continues to focus on more efficient speech recognition systems with higher speech recognition accuracy.

SUMMARY OF THE INVENTION

In one embodiment, a new hybrid speech recognition system combines Fuzzy Matrix Quantization (FMQ) and Fuzzy Vector Quantization (FVQ) with a Hidden Markov Model (HMM) to efficiently utilize processing resources and improve speech recognition performance. This FMQ/HMM_FVQ/HMM system exploits the "evolution" of speech short-term spectral envelopes with error compensation from FVQ/HMM processes. Acoustic noise may affect particular frequency domain subbands. This FMQ/HMM_FVQ/HMM system exploits localized noise by efficiently allocating enhanced processing technology to target noise-affected input signal parameters and minimize noise influence. In one embodiment, the enhanced processing technology employs a weighted LSP and signal energy related distance measure in a LBG algorithm.

In one embodiment, vector quantization operates on a single frame of input signal frequency parameters and, at least generally, does not incorporate temporal signal information into the vector quantization operation. However, vector quantization performs particularly well when temporal information is scarce or non-existent, such as with short input signal duration. Matrix quantization operates on multiple input signal frames and, thus, utilizes both temporal and frequency information about the input signal. However, errors may be introduced into matrix quantization operations when operating on a short duration input signal. Thus, although matrix quantization generally leads to a higher recognition accuracy that vector quantization, vector quantization may compensate for matrix quantization errors that may occur when operating on brief duration input signals.

In one embodiment, multiple speech processing subsystems are employed to provide initial quantization data to respective speech classifiers. Output data from the speech classifiers may be combined in such a way to compensate for quantization errors introduced by the speech processing subsystems. In another embodiment, one of the speech processing subsystems includes a vector quantizer which provides quantization information to a speech classifier having hidden Markov models. Another speech processing subsystem includes a matrix quantizer which provides quantization information to another speech classifier having hidden Markov models. Output data from the respective speech classifiers is combined to, for example, provide error compensation for the matrix quantizer.

In one embodiment of the present invention, a speech recognition system includes a vector quantizer to receive first parameters of an input signal and generate a first quantization observation sequence, and a first speech classifier to receive the first quantization observation sequence from the vector quantizer and generate first respective speech classification output data. The speech recognition system further includes a matrix quantizer to receive second parameters of the input signal and generate a second quantization observation sequence, a second speech classifier to receive the second quantization observation sequence from the matrix quantizer and generate second respective speech classification output data, and a hybrid decision generator to combine corresponding first and second respective speech classification data to generate third respective speech classification data.

In another embodiment of the present invention, a method includes the steps of processing first parameters of an input signal, wherein the parameters include frequency and time domain parameters, and providing first output data relating the input signal to reference data. The method further includes the steps of processing second parameters of the input signal, wherein the parameters include frequency domain parameters, providing second output data relating the input signal to the reference data, and combining the first output data and second output data to compensate for errors in the first output data.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

The following definitions are used herein unless otherwise indicated:

Word—any spoken utterance including words and numbers,

Speech—any word.

The following abbreviations are used herein unless otherwise indicated:

FMQ—fuzzy matrix quantizer,
FVQ—fuzzy vector quantizer,
MQ—matrix quantization,
VQ—vector quantization,
HMM—hidden Markov model,
λ—a HMM process,
Pr(O/λ)—probability of λ producing observation O,
LSP—line spectral pair,
dB—decibel,
SD/SI—speaker dependent/speaker independent
SNR—signal to noise ratio.

Figure 3:
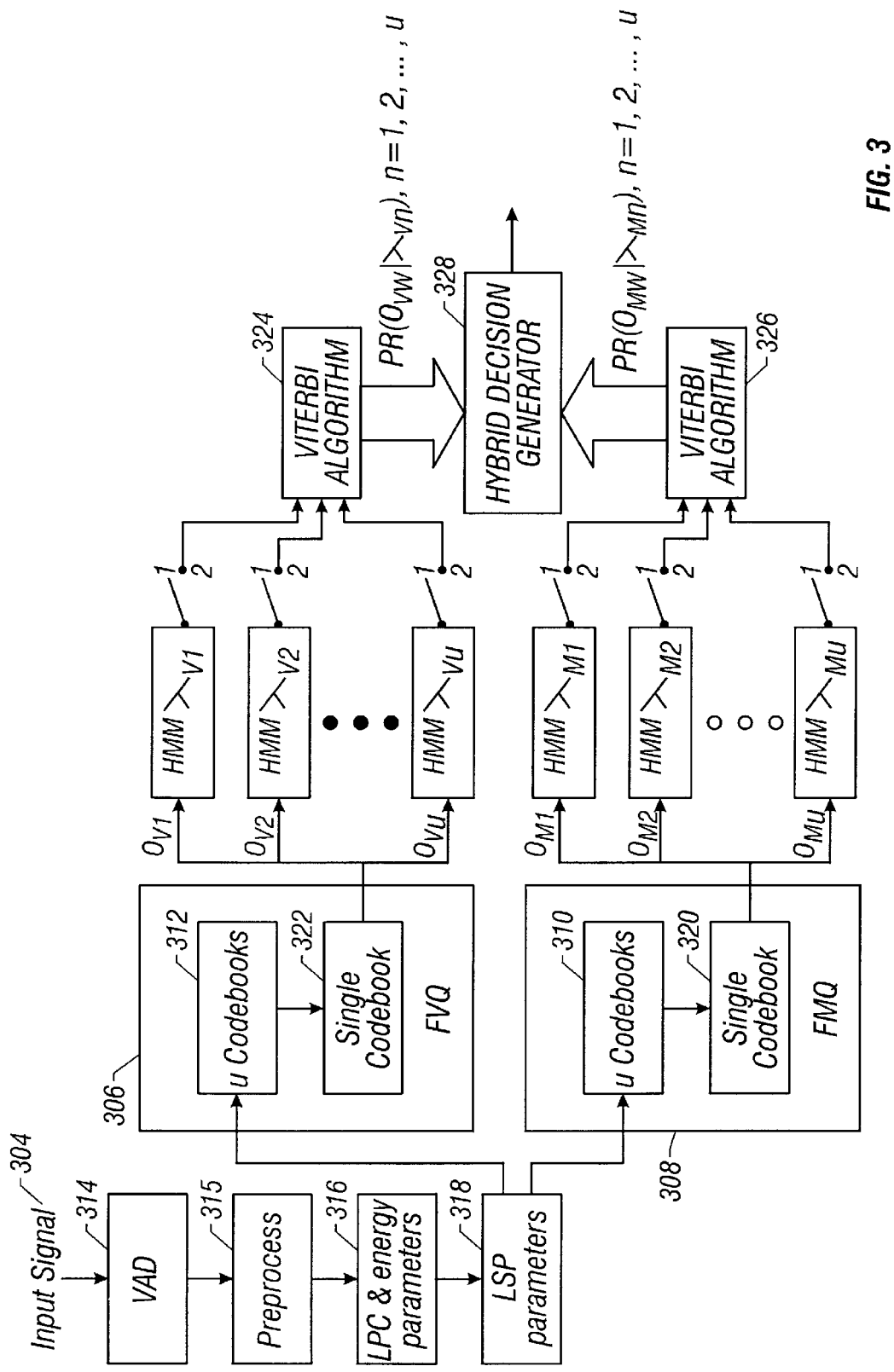
FIG. 3 illustrates a speech recognition system utilizing vector and matrix quantizers as a front end to respective hidden Markov models and a hybrid decision generator.

Referring to an embodiment of a speech recognition system in FIG. 3, speech recognition system 300 recognizes an input signal using the combined classification power of both time and frequency domain information derived from matrix quantization with error compensation from frequency domain information derived from vector quantization. Fuzzy processes may be implemented to further enhance recognition accuracy as illustratively discussed in chapter 3 of the Doctor of Philosophy thesis of Lin Cong entitled "A Study of Robust IWSR Systems" (L. Cong thesis) and located in the John Rylands University Library of Manchester in Manchester, England, which thesis is hereby incorporated by reference in its entirety. Vector quantization operates on a single frame of input signal frequency parameters and, at least generally, does not incorporate temporal signal information into the vector quantization processing operation. However, vector quantization performs particularly well when temporal information is scarce or non-existent, such as with short input signal duration. Matrix quantization operates on multiple input signal frames representing the time "evolution" of an input signal and, thus, utilizes both time domain and frequency domain information about the input signal. However, errors may be introduced into matrix quantization processing operations when operating on a short duration input signal. Thus, although matrix quantization generally leads to a higher recognition accuracy than vector quantization, vector quantization information may be utilized to compensate for matrix quantization errors that may occur when operating on input signals having limited useful temporal information.

The speech recognition system 300 may further utilize probabilistic processes to flier enhance speech recognition accuracy. Matrix and vector quantizers serve as front end speech classifiers to provide observation sequences to respective HMMs in order to characterize the HMMs during training. Each of the HMMs are preferably trained for a single word. During speech recognition processes, the respective HMMs and a Viterbi algorithm provide probabilistic output data which relate the input speech signal to a specific HMM. A hybrid decision generator combines the HMM output data corresponding to vector quantization and HMM output data corresponding to matrix quantization. The combination may, for example, weight the vector and/or matrix related HMM output data to, for example, compensate for matrix quantization error and, thus, enhance recognition accuracy. The speech recognition system 300 may be utilized in conjunction with SD/SI speech recognition.

Also, a single codebook may be employed by split matrix and vector quantizers to efficiently process input signal parameters for speech recognition. Quantization with a single codebook is illustratively described in U.S. patent application Ser. No. 08/883,979 by Safdar M. Asghar and Lin Cong and entitled "Speech Recognition System Using A Single Robust Codebook", which is hereby incorporated by reference in its entirety.

Referring to FIG. 3, in preparation for speech recognition with the flow path 321 set to position 1, speech recognition system 300 undergoes a training process to design respective codebooks for the FVQ 306 and FMQ 308. A data base of u words repeated r times and corrupted by s different levels of acoustic noise is used during the training process, where u corresponds to the vocabulary size of speech recognition system 300, and s and r are positive integers, for example, seven and two, respectively.

Initially during training of FVQ 306 and FMQ 308, a single codebook is designed for each of the u words for each of FVQ 306 and FMQ 308. Thus, u matrix codebooks 310 and u vector codebooks 312 are respectively designed with the nth word, n=1, 2, . . . u, being repeated r times at s SNR levels. Speech recognition system 300 is designed for robustness by training with multiple acoustic noise SNR corruption levels to better model realistic input signal 304 input conditions where speech is corrupted by acoustic noise. In the embodiment of FIG. 3, the respective SNR levels used to train speech recognition system 300 are clean speech (∞), 35 dB, 25 dB, 20 dB, 15 dB, 10 dB, and 5 dB to model various noises in an automotive environment. Other SNR values may be chosen to model other acoustic environments or more extensively model the automotive environment. Thus, a total training database of r times s (rs) entries is used to design each of the u matrix codebooks 310 and u vector codebooks 312. Each of the usr entries in the total training database is respectively provided as input signal 304 to speech recognition system 300 and preprocessed by preprocess operation 315 which, for example, band limits input signal 304 to 3.6 kHz and samples input signal 304 at 8 ksamples/sec with a resolution of 16 bits per sample. During speech recognition, when continuous speech is produced, voice activity detector (VAD) 314 effectively defines end points of input signal 304 words for SD/SI independent word speech recognition.

Figure 1:
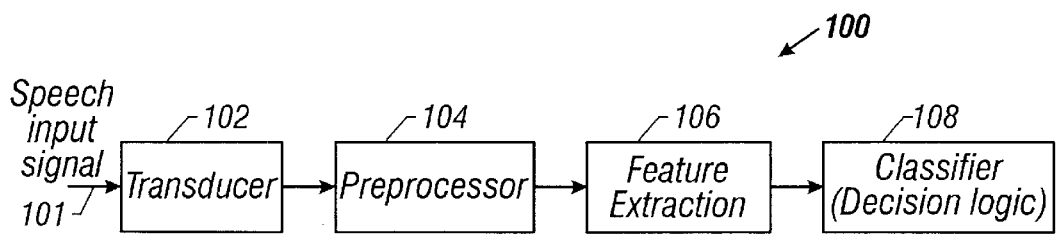
FIG. 1, labeled prior art, illustrates a general speech recognition system.
Figure 2:
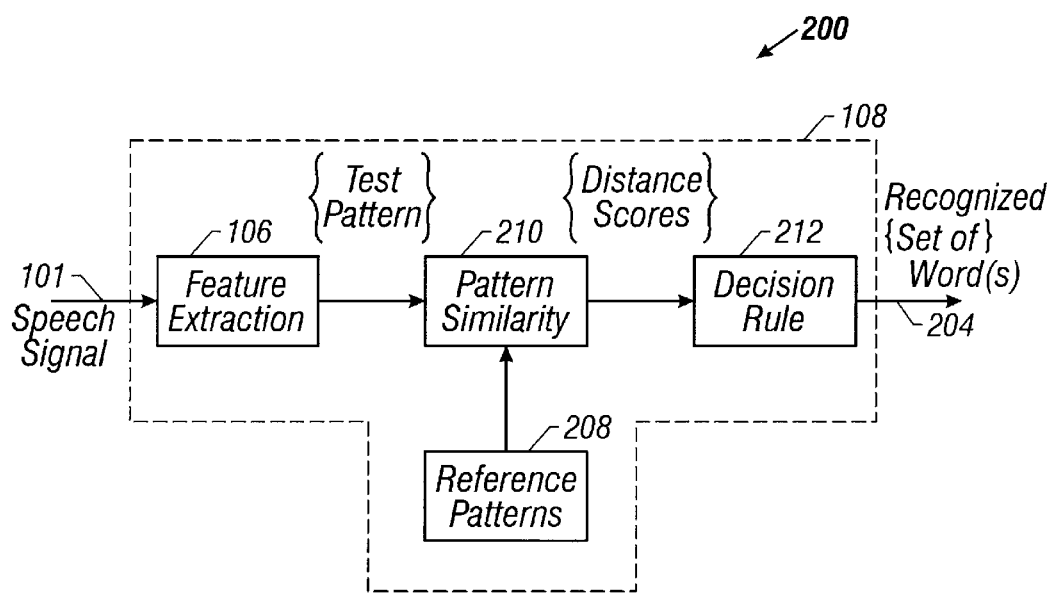
FIG. 2 illustrates a pattern-recognition based speech recognition system.
Figure 4:
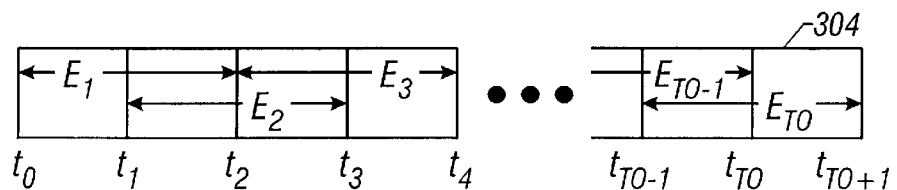
FIG. 4 illustrates a sequence of frames defining a speech input signal.

Referring to FIGS. 3 and 4, a P order linear predictive code (LPC) analysis is performed in LPC and energy parameters operation 316 on each of the TO frames of input signal 304 to compute the LPC coefficients for the acoustic signal 304 frame using, for example, the Burg algorithm. A 10 msec overlap is provided between frames, and each of the TO frames is defined by a time window of $t_q$ to $t_{q+2}$, q=0 through TO-1, with an overlap by an adjacent frame of $t_{q+1}$ to $t_{q+2}$. P may vary depending on tradeoffs between desired resolution and processing speed and in this embodiment, P is generally in the range of ten to sixteen, and is, for example, twelve. Frame times may vary and are, in general, chosen to represent an approximately static vocal tract period in a range of, for example, 10–30 msec, and are, for example, 20 msec.

Energy parameters may be generated in LPC and energy parameters operation 316 for each frame of each input signal 304. Spectral frequency parameters alone may be used to characterize an input signal 304 and codewords. Additionally, both energy and spectral frequency parameters may be used to characterize an input signal 304 and codewords and to generate a quantization distance measure. When the input signal 304 is corrupted by an acoustic noise signal, a distance measure using determined energy and frequency parameters enhances the distinction between respective input signals by at least partially suppressing the noise signal component of the input signal 304. For example, during an interval of time, acoustic noise signal energy is relatively constant in the time domain while the speech word signal energy typically varies more substantially during the same interval of time. By determining the first derivative or change of the input signal energy over different intervals of time, corruption by a noise signal with relatively constant energy may be significantly eliminated to enhance the distinction between respective input signal words. Furthermore, the energy of the second derivative or change of the input signal first energy derivative during the same intervals of time may be used to further enhance the distinction between respective input signal words.Furthermore, as described in more detail below, error factors may be derived and employed in the distance measure to further address acoustic noise corruption of the input signal 304 parameters.

Additionally, during predetermined time intervals, words typically have unique energy "signatures", and, thus, utilizing input signal energy parameters can be used to increase classification accuracy. The energy, $E_y$, in each flame of the input signal 304 may be used during training to develop codeword parameters in FVQ 306 and FMQ 308, and be used during recognition to compare input signal 304 energy parameters to corresponding codeword parameters derived from energy parameters of training database entries. The utilization of input signal energies for classification purposes is further illustratively described in the U.S. patent application Ser. No. 08/907,145 by Safdar M. Asghar and Lin Cong entitled "Robust Speech Parameters In A Robust Speech Recognition System", which is hereby incorporated by reference in its entirety.

To utilize input signal 304 energy distinctions and typical noise energy characteristics, each frame of input signal 304 is processed in LPC and energy parameters operation 316 to also determine the respective energy, $E_y$, in the yth frame, y=1, 2, ..., TO, during the 20 msec time interval of $t_q$ to $t_{q+2}$, where $E_y$ is defined as:

$$E_y = \sum_{n=0}^{N} |s(n)_y|^2,$$

where $s(n)_y$ is the sampled input signal of the yth frame, and N equals the number of samples in the yth frame defined by the time interval $t_q$ to $t_{q+2}$, which equals 160 when input signal 304 is sampled at 8 ksamples/sec.

Input signal 304 generally represents a speech signal word which may be corrupted by an acoustic noise signal. To decrease the amount of data used to represent the energy signature of each input signal 304, $E_y$ for each frame is normalized using the frame of input signal 304 having the maximum energy, $E_{max}$, i.e.

$$E_{y,norm} = \frac{E_y}{E_{max}}, y = 1, 2, ..., TO.$$

To further reduce the amount of data used to represent each input signal 304 energy signature while maintaining sufficient resolution to distinguish between different input signals, the logarithm of $E_{y,norm}$, is determined in LPC and energy parameters operation 316. Log $E_{y,norm}$ for each frame may be used during training and during recognition as a parameter in the quantization process.

In some environments, such as an automobile environment, noise signals are generally predictable or may be dynamically determined and occupy a low frequency spectral region. In the sampling window defined by the time interval $t_q$ to $t_{q+2}$, the rate of change of the noise signal from frame to frame is small when $t_{q+1}$ minus $t_q$ is relatively small. Additionally, overlapping of successive frames effectively decreases the frame time interval from $t_{q+2}-t_q$ to $t_{q+1}-t_q$ for purposes of determining frame-to-frame energy changes. Frame times may vary inversely to the noise signal frequency and processing performance. Thus, when input signal 304 is corrupted by a noise signal, taking the first derivative of each frame of input signal 304 in LPC and energy parameters operation 316 aids in suppressing the impact of any noise signal. The energy of the first derivative, $E'_y$, of each frame of the input signal is defined as, $$E'_y = (E_y)' = E_y - E_{y-1},$$

where $E_y$ is the original energy of the yth frame, y=1, 2, ..., TO, and $E_{y-1}$ is the original energy of the preceding (y−1)th frame. For y=1, $E_{y-1}$ is zero. As with the original input signal 304, the first derivative energy data, $E'_y$, may be reduced for input signal 304 while maintaining sufficient resolution by utilizing the first derivative of $E_{y,norm}$ to generate normalized first derivative energy parameters, $E'_{y,norm}$. Furthermore, the data may be reduced in LPC and energy parameters operation 316 further for efficient processing by determining the logarithm of $E'_{y,norm}$, and also using log $E'_{y,norm}$ as a parameter in the quantization process to suppress the impact of low frequency noise.

Additionally, in LPC and energy parameters operation 316, the second derivative of the energy, $E''_y$, in each frame of input signal 304 is also determined and defined as, $$E''_y = (E_y')' = E'_y - E'_{y-1},$$

where $E_y'$ is the first derivative of the original energy $E_y$ of the yth frame, y=1, 2, ..., TO, and $E_{y-1}$ is the first derivative of energy of the preceding (y−1)th frame. For y=1, $E'_y$ is zero. As with the original input signal 304 and the first derivative energy data, the second derivative energy data, $E''_y$, y=1, 2, ..., TO, may be reduced for input signal 304 while maintaining sufficient resolution by utilizing the first derivative of the normalized first derivative energy parameter, $E'_y$ norm to generate normalized second derivative energy parameters, $E''_{y,norm}$. Furthermore, the data may again be reduced further by determining the logarithm of log $E''_{y,norm}$, and log $E''_{y,norm}$ may also be used as a parameter in the quantization process.

The training process continues with LSP operation 318 generating, in a well-known manner, LSP frequencies from the respective LPC coefficients. LSP coefficients are, thus, generated for each input signal 304 frame for all s SNR levels from the LPC coefficients. The LSP representations of input signal 304 are used to define a spectral envelope, and they provide a robust representation of the speech short-term magnitude spectral envelope of input signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of input signal 304 and the corresponding all-pole filter H(z)=G/A(z), where A(z) is the inverse filter given by $$A(z)=1+a_1z^{-1}+a_2z^{-2}+...+a_pz^{-P}$$

where P is the order of the predictor and $\{a_i\}$ are the prediction coefficients, the LSPs are defined by decomposing the inverse filter polynomial into two polynomials, $$P(z)=A(z)+z^{-(P+1)}A(z-1)$$

and $$Q(z)=A(z)-z^{-(P+1)}A(z-1)$$

where P(z) is a symmetric polynomial, Q(z) is an anti-symmetric polynomial and $$A(z) = \frac{1}{2}[P(z) + Q(z)].$$

The roots of the polynomials P(z) and Q(z) define the LSP frequencies (coefficients).

Each of the u matrix codebooks 310 for a given vocabulary word is designed by developing a matrix entry from each of the sr entries for a corresponding input signal 304 vocabulary word $W_{nkm}$, n=1, 2, ... u, k=1,2, ..., s, m=1, 2, ..., r, from the database of usr words. The sr matrix entries for each of the u vocabulary words at each of the s SNR levels are processed to optimally cluster each of the sr entries for each of the u matrix codebooks 310 into CM cells. Each of the u vector codebooks 312 for a given vocabulary word is designed by developing a vector entry from each of the sr entries for a corresponding input signal 304 word $W_{nkm}$, n=1, 2, ... u, k=1, 2, ..., s, m=1, 2, ..., r, from the database of usr words. The sr vector entries for each of the u words at each of the s SNR levels are processed to optimally cluster each of the sr entries for each of the u vector codebooks 312 into $C_v$ cells.

A centroid is computed for each of the $C_M$ and $C_v$ cells for each of the u matrix codebooks 310 and u vector codebooks 312, respectively, for minimum quantization distortion using, for example, a Fuzzy C-algorithm or a fuzzy Linde-Buzo-Gray (LBG) algorithm as illustratively discussed in chapter 3 of the L. Cong thesis and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Thus, u matrix codebooks 310 in FMQ 308 and u vector codebooks 312 in FMQ 306 are designed.

To reduce demands on processing resources, each of the u matrix codebooks 310 may be used to design a single matrix codebook 320 by combining the CM centroids of each of the u matrix codebooks 310 into u times C centroids of the single matrix codebook 320. The individual centroids are preferably unaltered after combining. $C_M u$ may be chosen to accommodate available speech recognition system 300 resources and is, for example, equal to the training vocabulary word size times 16. Additionally, each of the u vector codebooks 312 are used to design a single vector codebook 322 by combining the $C_v$ centroids of each of the u vector codebooks 312 into u times $C_v$ centroids of the single vector codebook 322. The individual centroids are preferably unaltered after combining. $C_v u$ may be chosen to accommodate available speech recognition system 300 resources and is, for example, also equal to the training vocabulary word size times 16.

FMQ 308 utilizes interframe information related to the "evolution" of the speech short-term spectral envelopes input signal energy parameters of acoustic signal 304 by operating on N consecutive, overlapping speech frames of acoustic signal 304 (FIG. 4). FVQ 306 is a special case of FMQ 308 where N is set to one, and, thus, FVQ 306 operates within the frequency domain and not the time domain. Each frame of input signal 304 is represented by P LSP coefficients, and, thus, an N frames input signal segment provides a P×N matrix of LSP coefficients for FMQ 308 and a P dimension vector for FVQ 306. Each frame is also represented by the three energy parameters, log $E_{y,norm}$, log $E'_{y,norm}$, and log $E''_{y,norm}$, and, thus, the N frame's input signal segment provides an additional 3×N matrix of energy parameters for FMQ 308 and 3 additional dimensions to form a P+3 vector for FVQ 306. Each matrix entry for FMQ 308 and vector entry for FVQ 306 for an input signal 304 word $W_{nkm}$ may be designed using a training set of TO input signal spectral and energy parameter vectors respectively derived from each of the TO frames of each acoustic signal 304 word $W_{nkm}$, which result in a set $X=\{x_1, x_2, \ldots, x_T\}$ of T, (P+3)×N matrices for FMQ 308 and P+3 dimension vectors for FVQ 306 for each acoustic signal 304 word $W_{nkm}$, where T=int(TO/N) and $x_k$ has the general form of:

$$x_k = \begin{bmatrix} x^k_{11} & x^k_{12} & \cdots & x^k_{1N} \\ x^k_{21} & x^k_{22} & \cdots & x^k_{2N} \\ \cdots & \cdots & \cdots & \cdots \\ x^k_{P1} & x^k_{P2} & \cdots & x^k_{PN} \\ x^k_{P+1,1} & x^k_{P+1,2} & \cdots & x^k_{P+1,N} \\ x^k_{P+2,1} & x^k_{P+2,2} & \cdots & x^k_{P+2,N} \\ x^k_{P+3,1} & x^k_{P+3,2} & \cdots & x^k_{P+3,N} \end{bmatrix} = [\bar{x}_k(1), \bar{x}_k(2), \ldots, \bar{x}_k(N)],$$

where the $\bar{x}k(j)=[x_{1j}^k x_{2j}^k \ldots x_{(P+3)j}^k]'$, j=1, 2, ..., N, k=1, 2, ..., T for each word $W_{nkm}$ is grouped by word to form the rs entries in the corresponding nth FMQ 310 codebook and the $\bar{x}k(j) =[x_{1j}^k x_{2j}^k \ldots x_{(P+3)j}^k]'$, j=1, k=1, 2, ..., T for each word $W_{nkm}$ is grouped by word to form the rs entries in the corresponding nth FVQ 312 codebook. The first P entries of the ith column vector are the first through Pth LSP spectral coefficients, respectively, and the last three parameters (P+1 through P+3) are log $E_{y,norm}$, log $E'_{y,norm}$, and log $E''_{y,norm}$, respectively, for the jth column. The T $\bar{x}k(j)$ matrices for each word entry in the matrix codebooks is processed using, for example, the LBG algorithm, to yield a $C_M$-cell partitioning of the matrix space for each of the matrix codebooks 310. The $\bar{x}k(j)$ vectors for each word entry in the vector codebooks is processed using, for example, the CBG algorithm to yield a $C_v$-cell partitioning of the vector space for each of the u vector codebooks 312. Each of the u matrix codebooks 310 contains $C_M$ $v_{Mi}$, i=1,2, ...,C, (P+3)×N, codeword matrices, and each of the u vector codebooks 312 contains $C_v$ $v_{vi}$, i=1,2, ...,C, P+3 dimension codeword vectors, where $v_i$, for both $v_{Mi}$ and $v_{Vi}$, has the general form of:

$$v_i = \begin{bmatrix} v^i_{11} & v^i_{12} & \cdots & v^k_{1N} \\ v^i_{21} & v^i_{22} & \cdots & v^k_{2N} \\ \cdots & \cdots & \cdots & \cdots \\ v^i_{P1} & v^i_{P2} & \cdots & v^i_{PN} \\ v^i_{P+1,1} & v^i_{P+1,2} & \cdots & v^i_{P+1,N} \\ v^i_{P+2,1} & v^i_{P+2,2} & \cdots & v^i_{P+2,N} \\ v^i_{P+3,1} & v^i_{P+3,2} & \cdots & v^i_{P+3,N} \end{bmatrix} = [\bar{v}_i(1), \bar{v}_i(2), \ldots, \bar{v}_i(N)],$$

where $\bar{v}i(j)=[v_{1j}^i v_{2j}^i \ldots v_{(P+3)j}^i]'$, i=1, 2, ..., C and j=1, 2, ..., N for the u matrix codebooks 310 and j=1 for the u vector codebooks 312. "$V_M$" refers to the $C_M$ $V_{Mi}$ matrix centroids, collectively, and "$V_v$" refers to the $C_v$ $V_i$ vector centroids, collectively.

Each of the $C_M$ codeword matrices $v_{Mi}$ for each of the u matrix codebooks 310 may be combined as described above to form the single matrix codebook 320 having $C_M$ times u codeword matrices $v_{Mi}$, i=1, 2, ..., $C_M U$, with $C_M$ codewords per vocabulary word. Also, each of the $C_v$ codeword matrices $v_{VI}$ for each of the u vector codebooks 312 may be combined as described above to form the single vector codebook 322 having $C_v$ times u codeword matrices $V_{vi}$, i=1,2, . . . , $C_M$u, with $C_v$ codewords per vocabulary word.

During quantization a distance measure is determined between predetermined codeword parameters and input signal parameters. The input signal is quantized by associating the input signal parameters to parameters of a single codeword in respective matrix and vector quantizers when making a 'hard' decision. When using a fuzzy decision process, the input signal is quantized to parameters of multiple codewords in the respective matrix and vector quantizers using a weighted degree of closeness. The type of parameters used to represent input signals and the codewords in respective matrix and vector codebooks and the distance measure algorithm employed play an important role in classification accuracy, especially in acoustically noisy environments.

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 300–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters.

A distance measure between the input signal 304 spectral frequencies and codeword spectral frequencies may be manipulated to further compensate for noise corruption. More specifically, noise compensation error factors may be computed using an error power spectrum of an input signal and a predicted input signal. The noise to be compensated for may be known, for example, from knowledge of a specific operating environment or may be dynamically determined. The error factors may be used to appropriately shift and weight each of the ith input signal and codeword spectral frequencies to compensate for noise corruption. Thus, when the energy parameters are combined with other signal parameters, such as line spectral pair coefficients, recognition accuracy may be enhanced. Exemplary distance measures and algorithms are described below and illustratively described in chapter 3 of the L. Cong thesis and in U.S. patent application Ser. No. 08/883,980 by Safdar M. Asghar and Lin Cong entitled "Robust Distance Measure In A Speech Recognition System", which is hereby incorporated by reference in its entirety.

One exemplary robust LSP distance measure $d(f, \hat{f})$ is computed by FVQ 306 and FMQ 308 to address noise frequency distribution. The distance measure $d(f,\hat{f})$ between LSP coefficients of vector f, formed from LSP coefficients in LSP operation 318 from input signal 304, and LSP coefficients of a reference vector $\hat{f}$, which is a vector centroid in a codebook of FVQ 306 and vector entries of a matrix codebook centroid matrix in FMQ 308, is given by:

$$d(f, \hat{f}) = \sum_{i=1}^{G} \alpha_1\left[(f_i - e_i^{b1}) - \hat{f}_i)\right]^2 + \sum_{i=G+1}^{P} \alpha_2\left[(f_i - \hat{f}_i)e_i^{b2}\right]^2 +$$

$$\sum_{i=P+1}^{P+3} \alpha_3\left[E_i - \hat{E}_i\right]^2,$$

where $f_i$ and $\hat{f}_i$ are the ith LSP in the input signal and codeword vector, respectively. The constants $\alpha_1$, $\alpha_2$, $\beta_1$ and $\beta_2$ are experimentally determined to minimize quantization error. For the automotive noise environment studied, a, is set to 1.6, $\alpha_2$ is set to 0.68, $\beta_1$ is set to 0.5, and $\beta_2$ is set to 0.25. $E_i$ and $\hat{E}_i$ for i=P+1 to P+3 represent the energy (i=P+1), first derivative of the energy (i=P+2), and second derivative of the energy (i=P+3), of the input signal 304 and codeword vector, respectively. $\alpha_3$ is experimentally determined and is, for example, 100. When noise amplitude is large, the quantization errors of FVQ 306 and FMQ 308 may also be large. Thus, when speech is corrupted by car noise, the frequency shift for the first G order LSP coefficients can compensate the car noise effect at low LSP frequencies and the frequency weight can compensate the G+I to P order coefficients at high LSP frequencies to reduce quantization error. Reducing quantization error improves the recognition accuracy of speech recognition system 300.

The error $e_i$ is the weight and frequency shift for the ith LSP and is given by the LPC error power spectrum at the different test LSP frequencies. Input signal 304 is sampled at a rate of n samples per second, and one frame of input signal 304 is represented by input signal 304 s(n) and an error, e(n), between the input signal 304 s(n) and a predicted input signal 304, ŝ(n), as defined by $$e(n) = s(n) - \hat{s}(n) = s(n) - \sum_{k=i}^{P} \alpha_k s(n-k)$$

where $\alpha_k$ are prediction coefficients and are selected to minimize the total squared prediction error defined by the energy E(n) of e(n):

$$E_n = \sum_m e^2(m) = \sum_m [s_n(m) - \hat{s}_n(m)]^2$$

and can be found by setting a $\delta E_n/\delta\alpha_1=0$, for i=1, 2, . . . , P.

A discrete Fourier transform of e(n) yields: $|E(e^{j2\times fi})|^2$, i=1,2, . . . ,P which is the spectrum associated with the input signal 304 represented by P order LSPs as a function of LSP frequencies. Thus, the error $e_i$ is defined as:

$$ei = |E(e^{j2\pi fi})|^2$$

where $f_i$ is the ith LSP frequency of the input signal 304.

The shifted frequencies are the frequencies at which noise energy is primarily concentrated. Noise energy concentrations may be dynamically detected using a noise detector (not shown) or may be predetermined based on knowledge of a known user environment. Additionally, in some operating environments, such as in a car, noise changes according to traveling speed. The speed can be detected and a database of predicted noise energy frequency concentration may be accessed by a processor (not shown) to dynamically adjust the error compensation of the robust distance measure.

Continuing the training process of speech recognition system 300, each of the training database entries in the urs training word database are provided as a respective training input signal 304 to speech recognition system 300. Each input signal 304 word $W_{nkm}$ is preprocessed by preprocess operation 312, and LPC coefficients and energy parameters log $E_{y,norm}$, log $E'_{y,norm}$, and log $E''_{y,norm}$ are derived in LPC and energy parameters operation 316 from each frame of input signal 304 as described above. Each of the LPC coefficients is converted into P respective LSP frequencies by LSP operation 318. Each of the input signal 304 training words $W_{nkm}$ is again represented by a respective set of the TO speech spectral vectors for each frame of each input signal 304 word $W_{nkm}$, which result in the set $X=\{x_1, x_2, \ldots, x_T\}$ of T, P+3×N matrices for FMQ 308 and respective P+3 dimension vectors for FVQ 306 for each input signal 304 word $W_{nkm}$, where T=int(TO/N) with $x_k$ having the general form of:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \\ x_{P+1,1}^k & x_{P+1,2}^k & \cdots & x_{P+1,N}^k \\ x_{P+2,1}^k & x_{P+2,2}^k & \cdots & x_{P+2,N}^k \\ x_{P+3,1}^k & x_{P+3,2}^k & \cdots & x_{P+3,N}^k \end{bmatrix} = [\bar{x}_k(1), \bar{x}_k(2), \ldots, \bar{x}_k(N)],$$

where N equals one for single vector codebook 322.

The fuzzy matrix quantization of each of the training words $W_{nkm}$, using the single matrix codebook 320, is described by a $C_M u \times T$ fuzzy classification matrix $U_{MF}$ with elements $u^F_{ik} \in [0,1]$, $i=1,2,\ldots,C_M u$, $k=1,2,\ldots,T$. The value of $u^F_{ik}$, $0 \leq u^F_{ik} \leq 1$, indicates the degree of fuzziness of the kth input matrix $x_k$ to the ith partitioning cell which is represented by the centroid $v_{Mi}$. The fuzzy classification matrices $U_{VF}$ and $U_{MF}$ are defined generally as:

$$U_{BF} = \begin{matrix} O_1 \ O_2 \ , \ , \ , \ O_T \\ \\ \begin{array}{c c c c} O_1 & O_2 & \cdots & O_T \end{array} \\ \begin{bmatrix} u^F_{11} & u^F_{12} & \cdots & u^F_{1T} \\ u^F_{21} & u^F_{22} & \cdots & u^F_{2T} \\ \cdots & \cdots & \cdots & \cdots \\ u^F_{Cu,1} & u^F_{Cu,2} & \cdots & u^F_{Cu,T} \end{bmatrix} \end{matrix}$$

The two conditions are also satisfied:

$$\sum_{i=1}^{C_M u} u^F_{ik} = 1 \text{ and } \sum_{k=1}^{T} u^F_{ik} > 0$$

In this case, $u^F_{ik}$ is derived as:

$$u^F_{ik} = \frac{1}{\sum_{j=1}^{C_M u} \left( \frac{d_{ik}(x_{Mk}, v_{Mi})}{d_{jk}(x_{Mk}, v_{Mj})} \right)^{\frac{1}{(F-1)}}}.$$

where the constant F influences the degree of fuzziness for F>1.

The columns of probability mass vectors $O_{Mk}$ of the classification matrix $U_{MF}$ "map" an input matrix $X_{Mk}$ into a probability mass vector of indices $O_{Mk}=\{u_{1k}, u_{2k}, \ldots, u_{Cuk}\}$ which results in the distance $$J(O_k, V_M) = \sum_{i=1}^{C_M u} u^F_{ik} d(x_{Mk}, v_{Mi}).$$

When using the robust distance measure, $d(x_{Mk}, v_{Mi})$ is the distance measure $$d(x_{Mk}, v_{Mi}) = \frac{1}{N} \sum_{n=1}^{N} d(\bar{x}_{Mk}(n), \bar{v}_{Mi}(n)) \text{ and}$$

$$d(\bar{x}_{Mk}(n), \bar{v}_k(n)) = \sum_{m=1}^{G} \alpha_1 \left[ (x_{mn}^k - e_1^{B_1} - v_{mn}^i) \right]^2 + \sum_{m=G+1}^{P} \alpha_2 \left[ (x_{mn}^k - v_{mn}^i) e_i^{B_2} \right]^2 + \sum_{m=P+1}^{P+3} \alpha_3 (x_{mn}^k - v_{mn}^i)^2.$$

Furthermore, the overall distance of the $C_M u$ entries of FMQ 308 operating on the X matrix set, input signal 304 word $W_{nkm}$ is $$J(U_{MF}, V_M) = \sum_{k=1}^{T} \sum_{i=1}^{C_M u} u^F_{ik} d(x_{Mk}, v_{Mi}).$$

Note that the summation of $O_{Mk}$ entries is equal to unity. The largest component of $O_{Mk}$ is the one which corresponds to the codeword with the smallest $d(x_k, v_i)$ value. $O_{Mk}$ can be interpreted as a probability mass vector relating the input matrix $x_k$ to all $V_{Mi}$, $i=1,2,\ldots,C_M u$. The total observation sequence $O_{Mn}$ of probability mass vectors for each input signal 304 word for one codebook is defined as $O_{Mn}=\{O_1, O_2, \ldots, O_T\}$, $O_{Mk}=\{u_{1k}, u_{2k}, \ldots, u_{Cuk}\}$.
Equation $$J(U_{MF}, V_M) = \sum_{k=1}^{T} \sum_{i=1}^{C_M u} u^F_{ik} d(x_k, v_i)$$

provides the FMQ distance measure. Both fuzzy and hard decision matrix quantization distance measures can be represented by the general distance equation:

$$FD_M = J(W, V_M) = \sum_{k=1}^{T} \sum_{i=1}^{C_M u} w_{ik} d(x_k, v_i),$$

where $$w_{Mik} = \begin{cases} u_{ik} & u_{ik} \in \{0, 1\} \\ u^F_{ik} & u_{ik} \in [0, 1] \end{cases}$$

Fuzzy matrix quantization is further illustratively discussed in chapter 3 of the L. Cong thesis and Xydeas and Cong, "Robust Speech Recognition in a Car Environment," International Conf. on Digital Signal Processing, Vol. 1, pp. 84–89, June, 1995, Cyprus, which is herein incorporated by reference in its entirety. Hard decision matrix quantization be used to quantize input signal 304 and is illustratively discussed in chapter 3 of the L. Cong thesis.

The fuzzy vector quantization of each of the training words $W_{nkm}$, using the single codebook 322, is described by a $C_v u \times T$ fuzzy classification matrix $U_v F$ with elements $u^F_{ik}$ $\in [0,1]$, $i=1,2,\ldots,C_v u$, $k=1,2,\ldots,T$. The value of $u^F_{ik}$, $0 \leq u^F_{ik} \leq 1$, indicates the degree of fuzziness of the kth input matrix $x_{Vk}$ to the ith partitioning cell which is represented by the centroid $v_i$. The two conditions are also satisfied:

$$\sum_{i=1}^{C_V u} u^F_{ik} = 1 \text{ and } \sum_{k=1}^{T} u^F_{ik} > 0$$

In this case, $u^F_{ik}$ is derived as:

$$u^F_{ik} = \frac{1}{\sum_{j=1}^{Cu} \left(\frac{d_{ik}(x_{vk}, v_{vi})}{d_{jk}(x_{vk}, v_{vj})}\right)^{\frac{1}{(F-1)}}}.$$

where the constant F influences the degree of fuzziness when F>1.

The columns of probability mass vectors $O_{Vk}$ of the classification matrix $U_v F$ "map" an input matrix $x_{Mk}$ into a probability mass vector of indices $O_{Vk} = \{u_{1k}, u_{2k}, \ldots, u_{Cuk}\}$ which results in the distance $$J(O_{Vk}, V_V) = \sum_{j=1}^{Cu} u^F_{ik} d(x_{vk}, v_{vi}).$$

When using the robust distance measure, $d(x_{Vk}, v_{Vi})$ is the distance measure $$d(x_{Vk}, v_{Vi}) = \frac{1}{N}\sum_{n=1}^{N} d(\bar{x}_{Vk}(n), \bar{v}_{Vi}(n)) \text{ and}$$

$$d(\bar{x}_{Vk}(n), \bar{v}_i(n)) = \sum_{m=1}^{G} \alpha_1 \left[(x^k_{mn} - e^{B_1}_1 - v^i_{mn})\right]^2 +$$
$$\sum_{m=G+1}^{P} \alpha_2 \left[(x^k_{mn} - v^i_{mn})e^{B_2}_i\right]^2 +$$
$$\sum_{m=P+1}^{P+3} \alpha_3 (x^k_{mn} - v^i_{mn})^2.$$

Furthermore, the overall distance of the $C_v u$ entries of FMQ 308 operating on the $X_v$ matrix set, input signal 304 word $W_{nkm}$ is $$J(U_V F, V_V) = \sum_{k=1}^{T}\sum_{i=1}^{Cu} u^F_{ik} d(x_{Vk}, v_{Vi}).$$

Note that the summation of $O_{Vk}$ entries is equal to unity. The largest component of $O_{Vk}$ is the one which corresponds to the codeword with the smallest $d(x_{Vk}, v_{Vi})$ value. $O_{Vk}$ can be interpreted as a probability mass vector relating the input matrix $x_{Vk}$ to all $v_{Vi}$, $i=1,2,\ldots,C_v u$. The total observation sequence $O_{Vn}$ of probability mass vectors for each acoustic signal 304 word for one codebook is defined as $O_{Vn} = \{O_1, O_2, \ldots O_T\}$, $O_{Vk} = \{u_{1k}, u_{2k}, \ldots, u_{Cuk}\}$.

Equation $$J(U_V F, V_V) = \sum_{k=1}^{T}\sum_{i=1}^{C_V u} u^F_{ik} d(x_{Vk}, v_{Vi})$$

provides the FVQ distance measure. Both fuzzy and hard decision vector quantization distance measures can be represented by the general distance equation:

$$FD_V = J(W_V, V_V) = \sum_{k=1}^{T}\sum_{i=1}^{Cu} w_{ik} d(x_{Vk}, v_{Vi}),$$

where $$w_{Vik} = \begin{cases} u_{ik} & u_{ik} \in \{0, 1\} \\ u^F_{ik} & u_{ik} \in [0, 1] \end{cases}$$

Fuzzy vector quantization is further illustratively discussed in chapter 3 of the L. Cong thesis. Hard decision vector quantization be used to quantize input signal 304 and is illustratively discussed in chapter 3 of the L. Cong thesis.

During the training mode of speech recognition system 300, the training input data for the hidden Markov models of classifier HMM $\lambda_{Vn}$, $n=1, 2, \ldots, u$, are in one embodiment the observation sequences $O_{Vn}$ of probability mass vectors $O_{Vk}$ from a classification matrix $U_v$. The classification matrix $U_v$ is generated by FVQ 306 from a fuzzy vector quantized input signal 304 for each of the training words $W_{nkm}$ as described above. Each of the respective u vocabulary words for each repetition r and SNR levels s is, in one embodiment, fuzzy vector quantized to train a corresponding HMM $\lambda_{Vn}$ process $\lambda_n$. Each of the observation sequences $O_{Vn}$ from FVQ 306 for each of the urs training words train corresponding HMM $\lambda_{Vn}$ processes, i.e. for an nth vocabulary word, an input observation sequence $O_{Vn}$ trains only the nth HMM $\lambda_{Vn}$. Separate HMM $\lambda_{Vn}$'s may be built for males and females, and the number of states of each HMM $\lambda_{Vn}$ is set to, for example, five. HMM $\lambda_{Vn}$ training is further described in chapters 2 and 4 of the L. Cong thesis.

Likewise, during the training mode of speech recognition system 300, the training input data for the hidden Markov models of classifier HMM $\lambda_{Mn}$, n=1, 2, $\ldots$, u, are in one embodiment the observation sequences $O_{Mn}$ of probability mass matrices $O_{Mk}$ from a classification matrix $U_M$. The classification matrix $U_M$ is generated by FMQ$_{308}$ from a fuzzy matrix quantized input signal 304 for each of the training words $W_{nkm}$ as described above. Each of the respective u vocabulary words for each repetition r and SNR levels s is, in one embodiment, fuzzy matrix quantized to train a corresponding HMM $\lambda_{Mn}$ process $\lambda_n$. Each of the observation sequences $O_{Mn}$ from FMQ 308 for each of the urs training words train corresponding HMM $\lambda_{Mn}$ processes, i.e. for an nth vocabulary word, an input observation sequence $O_{Mn}$ trains only the nth HMM $\lambda_{Mn}$. Separate HMM $\lambda_{Mn}$'s may be built for males and females, and the number of states of each HMM $\lambda_{Mn}$ is set to, for example, five. HMM $\lambda_{Mn}$ training is further described in chapters 2 and 4 of the L. Cong thesis.

After training the speech recognition system 300, paths 2 are selected for entry into the recognition process. When any input signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames of t seconds each, such as t equal to 20 msec with a 10 msec overlap of each consecutive frame of $W_n$. Energy coefficients operation 315 generates the log $E_{y,norm}$, log $E_{y,norm}$, and log $E_{y,norm}$ energy coefficients. LPC and energy parameters operation 316 generates P LPC coefficients for each frame of the $W_n$, and LSP operation 332 generates Pth order LSP coefficients from the LPC coefficients as described above.

The speech recognition system 300 may be implemented in an electronic system as instructions and data stored in a memory and utilized by a processor or processors coupled to the memory.

Each frame of input signal 304 is again represented by P order LSP coefficients and the three energy parameters, and N frames of speech input signal segment of word $W_n$ provide a (P+3)×N matrix of LSP and energy coefficients for FMQ 308 and a respective P+3 dimension vector (N=1) for FVQ 306. For FMQ 308, input signal 304 word $W_n$ may, thus, be represented as a matrix $X_{MWn}=\{x_1,x_2,\ldots,x_T\}$ of T, (P+3)×N matrices for each input signal 304 word $W_{nkm}$, where T=int(TO/N). For FVQ 306, input signal 304 word $W_n$ may, thus, be represented as a matrix $X_{VWn}=\{x_1,x_2,\ldots,x_T\}$ of T, (P+3) dimension vectors for each input signal 304 word $W_{nkm}$. The T matrices of $X_{MWn}$ and the T vectors of $X_{VWn}$ are generally respectively defined by $x_k$:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \\ x_{P+1,1}^k & x_{P+1,2}^k & \cdots & x_{P+1,N}^k \\ x_{P+2,1}^k & x_{P+2,2}^k & \cdots & x_{P+2,N}^k \\ x_{P+3,1}^k & x_{P+3,2}^k & \cdots & x_{P+3,N}^k \end{bmatrix} = [\bar{x}_k(1), \bar{x}_k(2), \ldots, \bar{x}_k(N)],$$

$\bar{x}_k(j)=[x_{ij}^k x_{2j}^k \ldots x_{(P+3)j}^k]$, j=1,2,...k=1, 2, ..., T for FVQ 308 and $\bar{x}_k(j)=[x_{ij}^k x_{2j}^k \ldots x_{(P+3)j}^k]$, j=1,2, ..., T for FVQ 306.

FVQ 306 fuzzy vector quantizes the vector representation $X_{Wn}=\bar{x}_k(j)$, j=1, of word $W_n$ with the designed $C_v$u codeword entries of the single vector codebook 320. Single vector codebook 322 produces the fuzzy distance measure FD and yields an observation sequence $O_{Vn}$ of T probability mass vectors $O_{vk}$, j=1, 2, ..., Cu as described above. Observation sequence $O_{VW}$ is used as input data by a fuzzy Viterbi algorithm 324 operating on each of the HMM $\lambda_{Vn}$ processes, n=1, 2, ..., u. Fuzzy Viterbi algorithm operation 324, described in chapter 4 of L. Cong, "A Study of Robust IWSR Systems" utilizes a respective observation sequence $O_{VW}$ from each of the rs versions of each of the u words and fuzzy Viterbi algorithm 324 to produce a maximum likelihood probability $Pr(O_{VW}/\lambda_{Vn})$, n=1, 2, ..., u of the HMM $\lambda_{Vn}$ process producing the observation sequence $O_{VW}$. The u probability data outputs of the fuzzy Viterbi algorithm 324 are the respective maximum likelihood probability measures $Pr(O_{VW}/\lambda_{Vn})$ that the HMM $\lambda_{Vn}$ process produced the observation sequence $O_{VW}$, i.e. the maximum likelihood probability that the HMM $\lambda_{Vn}$ process corresponds to $W_n$.

Likewise, FMQ 308 fuzzy matrix quantizes the matrix representation $X_{Wn}=\bar{x}_k(j)$ of word $W_n$ with the designed $C_M$u codeword entries of the single matrix codebook 320. Single matrix codebook 320 produces the fuzzy distance measure FD and yields an observation sequence $O_{Mn}$ of T probability mass vectors $O_{Mk}$, j=1, 2, ..., $C_M$u. Observation sequence $O_{Mn}$ is used as input data by fuzzy Viterbi algorithm 326 operating on each of the HMM $\lambda_{Mn}$ processes, n=1, 2, ..., u. Fuzzy Viterbi algorithm operation 326, described in chapter 4 of L. Cong, "A Study of Robust IWSR Systems" utilizes a respective observation sequence $O_{MW}$ from each of the rs versions of each of the u words and fuzzy Viterbi algorithm 326 to produce a maximum likelihood probability $Pr(O_{MW}/\lambda_{Mn})$, n=1, 2, ..., u of the HMM $\lambda_{Mn}$ process producing the observation sequence $O_{MW}$. The u probability data outputs of the fuzzy Viterbi algorithm 326 are the respective maximum likelihood probability measures $Pr(O_{MW}/\lambda_{Mn})$ that the HMM $\lambda_{Mn}$ process produced the observation sequence $O_{MW}$, i.e. the maximum likelihood probability that the HMM $\lambda_{Mn}$ process corresponds to W.

When speech recognition system 300 operates in a recognition mode, the nth probability $Pr(O_{VW}|\lambda_{Mn})$ from HMM $\lambda_{Vn}$ is combined by the hybrid decision generator 328 with the nth $Pr(O_{MW}|\lambda_{Mn})$ from HMM $\lambda_{Mn}$ for n=1, 2, ..., u to generate FMQ error compensated classification data, D(n) for each of the u vocabulary words of speech recognition system 300, where D(n) is defined in one embodiment as:

$$D(n) \alpha Pr((O_{Mn}|\lambda_{Mn})PR(O_{Vn}|\lambda_{Vn}), n=1, 2, \ldots u.$$

The scaling constant 'α' may be adjusted to maximize recognition accuracy and is, for example, set to two. The input signal 304 is selected by the hybrid decision generator 328 to be the nth word when D(n)=min(D(n)), n=1, 2, ... u (note that the Viterbi algorithm internally computes the logarithm of outcome probabilities. Computing resources may be more favorably disposed to computing the logarithm of each D(n) for n=1, 2, ..., u, obtaining respective absolute values, and selecting the nth word as input signal 304 when D(n)=min(abs(D(n))), n=1, 2, ..., u. It will be recognized that either or both $Pr(O_{VW}|\lambda_{Mn})$ and $Pr(O_{MW}|\lambda_{Mn})$ may be scaled.

While the invention has been described with respect to the embodiments and variations set forth above, these embodiments and variations are illustrative and the invention is not to be considered limited in scope to these embodiments and variations. For example, it will be recognized that continuous time data and continuous time algorithms may be used in substitution of the discrete time data and discrete time algorithms, respectively. Additionally, other input signal parameter types may be used to characterize input signal 304, and other distance measures may be used. Using continuous time methods will generally increase processing requirements. Furthermore, output data from FVQ 306 and FMQ 308 may be combined without using subsequent stage speech classifiers, such as the HMMs, to provide speech recognition. For example, the overall respective distance measures from FVQ 306 and FMQ 308 may be combined, with or without weighting, to provide speech recognition. Accordingly, various other embodiments and modifications and improvements not described herein may be within the spirit and scope of the present invention, as defined by the following claims.

What is claimed is:

1. A speech recognition system comprising:
    a vector quantizer to receive first parameters of an input signal and generate a first quantization observation sequence;
    a first speech classifier to receive the first quantization observation sequence from the vector quantizer and generate first respective speech classification output data;
    a matrix quantizer to receive second parameters of the input signal and generate a second quantization observation sequence;

a second speech classifier to receive the second quantization observation sequence from the matrix quantizer and generate second respective speech classification output data; and a hybrid decision generator to combine corresponding first and second respective speech classification data to generate third respective speech classification data and to recognize the input signal from the third respective speech classification data.

2. The speech recognition system as in claim 1 wherein the first and second speech classifiers are a first and second set, respectively, of hidden Markov models.

3. The speech recognition system as in claim 2 wherein:

the speech recognition system has u vocabulary words, and u is an integer; the first respective speech classification output data includes probabilities, $Pr(O_{Vn}|\lambda_{Vn})$, n=1,2, ... u, related to respective ones of the first set of n hidden Markov models, $\lambda_{Vn}$, and the first quantization observation, $O_v$, sequence to one of the u vocabulary words, and n is an integer;

the second respective speech classification output data includes probabilities, $Pr(O_{Mn}|\lambda_{Mn})$, n=1,2, ... u, related to respective ones of the second set of n hidden Markov models, $\lambda_{Mn}$, and the second quantization observation sequence, $O_{Mn}$, to one of the u vocabulary words, and n is an integer;

the third classification data is $D(n)=\alpha Pr(O_{Mn}|\lambda_{Mn})+Pr(O_{Vn}|\lambda_{Vn})$, n=1, 2, ..., u and $\alpha$ is a weighting factor; to all $Pr(O_{Vn}|\lambda_{Vn})$ to compensate for recognition errors in $Pr(O_{Mn}|\lambda_{Mn})$; and the hybrid decision generator is further capable of recognizing the input signal as the ith vocabulary word when D(i) represents the highest probability that the input signal is the ith of the u vocabulary words.

4. The speech recognition system as in claim 1 wherein the vector and matrix quantizers utilize respective single codebooks.

5. The speech recognition system as in claim 1 wherein the input signal for reception by the vector quantizer and matrix quantizer is a spoken word.

6. The speech recognition system as in claim 1 wherein the first parameters of the input signal for reception by the vector quantizer include P order line spectral pairs of the input signal, and the second parameters of the input signal for reception by the matrix quantizer include temporally related P order line spectral pairs, wherein P is an integer.

7. The speech recognition system as in claim 5 wherein P equals twelve.

8. The speech recognition system as in claim 6 wherein the vector and matrix quantizers respectively are capable of determining a distance measure between an ith line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein N, is greater than or equal to one and less than or equal to P, and P is the highest order line spectral pair frequency of the input signal and codewords.

9. The speech recognition system as in claim 8 wherein a distance measure, $d(f,\hat{f})$, between the input signal parameters, f and the reference data parameters, $\hat{f}$, is defined by:

$$d(f,\hat{f}) = \sum_{i=1}^{Ni} \alpha_1[(f_i - e_i^{\beta_1} - \hat{f}_i)]^2 + \sum_{i=N_1+1}^{P} \alpha_2[(f_i - \hat{f}_i)e_i^{\beta_2}]^2$$

wherein $f_i$ and $\hat{f}_i$ are the ith line spectral pair frequency parameters in the input signal and respective codewords, respectively, $\alpha_1$, $\alpha_2$, $\beta_1$ and $\beta_2$ are are constants, and $e_i$ is the error power spectrum of the input signal and a predicted input signal at the ith line spectral pair frequency of the input signal.

10. The speech recognition system as in claim 9 wherein the constants $\alpha_1$, $\alpha_2$, $\beta_1$ and $\beta_2$ are set to substantially minimize quantization error.

11. The speech recognition system as in claim 8 wherein noise frequencies are primarily located in the frequency range substantially coinciding with the frequency range represented by line spectral pairs i=1 to $N_1$.

12. The speech recognition system as in claim 6 wherein the vector and matrix quantizers respectively are capable of determining a distance measure between an ith order line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order codeword line spectral pair frequencies and (ii) a weighting of the difference by an ith frequency weighting factor, wherein N, is greater than or equal to one and less than or equal to P, and P is the highest order line spectral pair frequency of the input signal and codewords.

13. The speech recognition system as in claim 12 wherein noise frequencies are primarily located in the frequency range represented by line spectral pairs i=1 to $N_1$.

14. The speech recognition system as in claim 1 wherein the first parameters of the input signal include the energy of the input signal and first and second derivatives of the the input signal energy.

15. The speech recognition system as in claim 1 wherein the vector and matrix quanitzers utilize fuzzy quantization.

16. A speech recognition system comprising:

a vector quantizer to receive line spectral pair input data corresponding to an input speech signal and to generate a first quantization observation sequence;

first hidden Markov models to receive the first quantization observation sequence from the vector quantizer and generate first respective speech recognition probabilities from each of the first hidden Markov models;

a matrix quantizer to receive temporally associated line spectral pair input data corresponding to the input speech signal and to generate a second quantization observation sequence;

second hidden Markov models to receive the second quantization observation sequence from the matrix quantizer and generate second respective speech recognition probabilities from each of the second hidden Markov models; and a hybrid decision generator to utilize the first and second respective speech recognition probabilities to combine corresponding first and second speech recognition probabilities and to recognize the input signal from the combined corresponding first and second speech recognition probabilities.

17. The speech recognition system as in claim 16 wherein:

the speech recognition system has u vocabulary words, and u is an integer;

the first respective speech recognition probabilities, $\Pr(O_{Vn}|\lambda_{Vn})$, n=1,2, ... u, related to respective ones of the first of n hidden Markov models, $\lambda_{Vn}$, and the first quantization observation, $O_v$, sequence to one of the u vocabulary words, and n is an integer;

the second respective speech recognition probabilities, $\Pr(O_{Mn}|\lambda_{Mn})$, n=1,2, ... u, related to respective ones of the second of n hidden Markov models, $\lambda_{Mn}$, and the second quantization observation sequence, $O_{Mn}$, to one of the u vocabulary words, and n is an integer;

the combined first and second respective recognition probabilities are respectively $D(n)=\alpha \Pr(O_{Mn}|\lambda_{Vn})+\Pr(O_{Vn}|\lambda_{Vn})$, n=1, 2, ..., u and $\alpha$ is a weighting factor to allow $\Pr(O_{Vn}|\lambda_{Vn})$ to compensate for recognition errors in $\Pr(O_{Mn}|\lambda_{Vn})$; and the hybrid decision generator is further capable of recognizing the input signal as the ith vocabulary word when D(i) represents the highest probability that the input signal is the ith vocabulary word.

18. The speech recognition system as in claim 16 wherein:

the line spectral pair input data are P order line spectral pairs of the input signal, wherein P is an integer; and the vector and matrix quantizers are each respectively capable of determining respective a distance measure between an ith line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein $N_1$ is greater than or equal to one and less than or equal to P, and P is the highest order line spectral pair frequency of the input signal and codewords.

19. The speech recognition system as in claim 18 wherein the distance measure, $d(f, \hat{f})$, between the input signal parameters, f and the reference data parameters, $\hat{f}$, is defined by:

$$d(f, \hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $f_i$ and $\hat{f}_i$ are the ith line spectral pair frequency parameters in the input signal and respective codewords, respectively, the constants $\alpha_1$, $\alpha_2$, $\beta_1$ and $\beta_2$ are set to substantially minimize quantization error, and $e_i$ is the error power spectrum of the input signal and a predicted input signal at the ith line spectral pair frequency of the input signal.

20. An apparatus comprising:

a first speech classifier to operate on first parameters of an input signal and provide first output data relating the input signal to reference data, wherein the input signal parameters include frequency and time domain parameters, wherein the first speech classifier further includes a first set of hidden Markov models;

a second speech classifier to operate on second parameters of the input signal and to provide second output data relating the input signal to the reference data, wherein the second parameters of the input signal include the frequency domain parameters, the second speech classifier further includes a second set of hidden Markov models; and a hybrid decision generator to combine the first output data and the second output data so that the second output data compensates for errors in the first output data and to generate third output data to classify the input signal.

21. The apparatus as in claim 20 wherein the first speech classifier includes a fuzzy matrix quantizer, and the second speech classifier includes a fuzzy vector quantizer.

22. The apparatus as in claim 20 wherein the second speech classifier is capable of operating on frequency domain parameters of the input signal.

23. The apparatus as in claim 20 wherein the frequency domain parameters are P order line spectral pair frequencies, wherein P is an integer.

24. The apparatus as in claim 20 wherein the first and second parameters of the input signal further include input signal energy related parameters.

25. The apparatus as in claim 20 wherein:

the first and second parameters of the input signal each respectively include P order line spectral pairs of the input signal, wherein P is an integer; and the first and second speech classifiers are each respectively capable of determining a respective distance measure between an ith line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein N, is greater than or equal to one and less than or equal to P, and P is the highest order line spectral pair frequency of the input signal and codewords.

26. The apparatus as in claim 25 wherein the distance measure, $d(f, \hat{f})$, between the input signal parameters, f and the reference data parameters, $\hat{f}$, is defined by:

$$d(f, \hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $f_i$ and $\hat{f}_i$ are the ith line spectral pair frequency parameters in the input signal and respective codewords, respectively, $\alpha_1$, $\alpha_2$, $\beta_1$ and $\beta_2$ are constants, and $e_i$ is the error power spectrum of the input signal and a predicted input signal at the ith line spectral pair frequency of the input signal.

27. The apparatus as in claim 26 wherein the constants $\alpha_1$, $\alpha_2$, $\beta_1$ and $\beta_2$ are set to substantially minimize classification error.

28. A method comprising:

processing first parameters of an input signal using a first speech classifier, wherein the parameters include frequency and time domain parameters;

providing first output data relating the input signal to reference data, wherein the first output data is provided from the first speech classifier to a second speech classifier;

processing the first output data using the second speech classifier;

providing second output data from the second speech classifier;

processing second parameters of the input signal using a third speech classifier, wherein the parameters include frequency domain parameters;

providing third output data relating the input signal to the reference data, wherein the third output data is provided from the third speech classifier to a fourth speech classifier;

processing the third output data using the fourth speech classifier; providing fourth output data from the fourth speech classifier;

combining the third output data and fourth output data to compensate for speech classification errors in the third output data; and classifying the input signal as recognized speech.

29. The method as in claim 28 wherein processing frequency and time domain parameters of the input signal comprises:

matrix quantizing the frequency and time domain parameters of the input signal; and processing frequency domain parameters of the input signal comprises:
vector quantizing the frequency domain parameters of the input signal.

30. The method as in claim 28 wherein combining third output data and fourth output data comprises:

weighting the fourth output data; and adding the weighted fourth output data to the third output data.

31. The method as in claim 28 wherein:

the reference data represents u vocabulary words, and u is an integer;

the first output data includes a first observation sequence, $O_{Vn}$, relating the input signal to the reference data;

the second speech classifier includes a first set of n hidden Markov models;

the second output data includes probabilities, $Pr(O_{Vn}|\lambda_{Vn})$, n=1, 2, . . . , u, related to respective ones of the first set of n hidden Markov models, $X_{Vn}$, and the first observation sequence, $O_{Vn}$;

the third output data includes a second observation sequence, $O_{Mn}$, relating the input signal to the reference data;

the fourth speech classifier includes a second set of n hidden Markov models;

the fourth output data includes probabilities, $Pr(O_{Mn}|\lambda_{Mn})$, n=1, 2, ..., u, related to respective ones of the second set of n hidden Markov models, $X_{Mn}$, and the second observation sequence, $O_{Mn}$;

combining the third output data and fourth output data comprises:

combining the probabilities $Pr(O_{Vn}|\lambda_{Vn})$ and $Pr(O_{Mn}|\lambda_{Mn})$ into a combination, D(n), wherein $D(n)=\alpha Pr(O_{Mn}|\lambda_{Mn})+Pr(O_{Vn}|\lambda_{Vn})$, n=1, 2, . . . , u and $\alpha$ is a weighting factor to allow $Pr(O_{Vn}|\lambda_{Vn})$ to compensate for speech classification errors in $Pr(O_{Mn}|\lambda_{Mn})$; and classifying the input signal as recognized speech comprises:

classifying the input signal as the ith of the u vocabulary words when D(i) represents the highest probability that the input signal is the ith vocabulary word.

32. The method as in claim 28 wherein:

the first and second parameters of the input signal each respectively include P order line spectral pairs of the input signal, wherein P is an integer;

processing first parameters of the input signal comprises:

determining a first distance measure between an ith line spectral pair frequency of the input signal and respective ith order line spectral pair frequencies of a plurality of first codewords, wherein the distance measure, for i=1 to $N_1$, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to P, and P is the highest order line spectral pair frequency of the input signal and the first codewords; and processing second parameters of the input signal comprises:

determining a second distance measure between an ith line spectral pair frequency of the input signal and respective ith order line spectral pair frequencies of a plurality of second codewords, wherein the distance measure, for i=1 to $N_1$, is proportional to (i) a difference between the ith input signal line spectral pair frequencies and the ith order line spectral pair frequencies of the second codewords and (ii) a shift of the difference by an ith frequency shifting factor, wherein $N_1$ is greater than or equal to one and less than or equal to P, and P is the highest order line spectral pair frequency of the input signal and the second codewords.

33. The method as in claim 32 wherein the first distance measures, $d(f, \hat{f})$, between the input signal parameters, f and the reference data parameters, $\hat{f}$, is defined by:

$$d(f,\hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f, \hat{f})$, $f_i$ and $\hat{f}_i$ are the ith line spectral pair frequency parameters in the input signal and the respective first codewords, the constants $\alpha_1, \alpha_2, \beta_1$ and $\beta_2$ are set to substantially minimize respective processing error, and $e_i$ is the error power spectrum of the input signal and a predicted input signal at the ith line spectral pair frequency of the input signal; and the second distance measures, $d(f, \hat{f})$, between the input signal parameters, f, and the reference data parameters, $\hat{f}$, is defined by:

$$d(f,\hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f, \hat{f})$, $f_i$ and $\hat{f}_i$ are the ith line spectral pair frequency parameters in the input signal and the respective second codewords, the constants $\alpha_1, \alpha_2, \beta_1$ and $\beta_2$ are set to substantially minimize respective processing error, and $e_i$ is the error power spectrum of the input signal and a predicted input signal at the ith line spectral pair frequency of the input signal.

34. A method of recognizing speech comprising:

receiving an input signal;

determining parameters of the input signal;

vector quantizing the parameters of the input signal to obtain first quantization output data;

classifying the first quantization output data;

matrix quantizing the parameters of the input signal to obtain second quantization output data;

classifying the second quantization output data; and generating an identification of the input signal as recognized speech based upon the classification of the first and second quantization output data.

35. The method as in claim 34 wherein generating the identification of the input signal further comprises:
   weighting the classification of the first quantization output data; and
   adding a the weighted classification of the first quantization output data and the classification of the second quantization output data.

36. The method as in claim 34 wherein determining parameters of the input signal comprises:
   determining P order line spectral pairs for each of TO flames of the input signal.

37. The method as in claim 34 wherein vector quantizing further comprises:
   vector quantizing the parameters of the input signal using a first single codebook; and wherein matrix quantizing further comprises:
   matrix quantizing the parameters of the input signal using a second single codebook.

38. The method as in claim 34 wherein vector quantizing further comprises:
   fuzzy vector quantizing the parameters of the input signal, wherein the first quantization output data is fuzzy data; and
   wherein matrix quantizing further comprises:
      fuzzy matrix quantizing the parameters of the input signal, wherein the second quantization output data is fuzz data.

39. The method as in claim 34 wherein:
   the identification of the input signal is one of u vocabulary words, and u is an integer;
   the first quantization output data is a first observation sequence, $O_{Vn}$, relating the input signal to the u vocabulary words;
   classifying the first quantization output data comprises:
      determining probabilities, $Pr(O_{Vn}|\lambda_{Vn})$, n=1, 2, ..., u, related to respective ones of a first set of n hidden Markov models, $\lambda_{Vn}$, and the first observation sequence, $O_{Vn}$;
   the second quantization output data is a second observation sequence, $O_{Mn}$, relating the input signal to the u vocabulary words;
   classifying the first quantization output data comprises:
      determining probabilities, $Pr(O_{Mn}|\lambda_{Mn})$, n=1, 2, ..., u, related to respective ones of a second set of n hidden Markov models, $\lambda_{Mn}$, and the second observation sequence, $O_{Mn}$; and
   generating an identification of the input signal further comprises:
      combining the probabilities $Pr(O_{Vn}|\lambda_{Vn})$ and $Pr(O_{Mn}|\lambda_{Mn})$ into a combination, D(n), wherein $D(n)=\alpha Pr(O_{Mn}|\lambda_{Mn})+Pr(O_{Vn}|\lambda_{Vn})$, n=1, 2, ..., u and a is a weighting factor to allow $Pr(O_{Vn}|\lambda_{Vn})$ to compensate for speech classification errors in $Pr(O_{Mn}|\lambda_{Mn})$, and the identification of the input signal is the ith of the u vocabulary words when D(i) represents the highest probability that the input signal is the ith vocabulary word.

40. The method as claim 34 wherein:
   the parameters of the input signal include P order line spectral pairs of the input signal, wherein P is an integer; and
   vector quantizing the parameters of the input signal comprises:
      determining a first distance measure between an ith line spectral pair frequency of the input signal and respective ith order line spectral pair frequencies of a plurality of first codewords, wherein the distance measure, for i=1 to $N_1$, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to P, and P is the highest order line spectral pair frequency of the input signal and the first codewords; and
   matrix quantizing the parameters of the input signal comprises:
      determining a second distance measure between an ith line spectral pair frequency of the input signal and respective ith order line spectral pair frequencies of a plurality of second codewords, wherein the distance measure, for i=1 to $N_1$, is proportional to (i) a difference between the ith input signal line spectral pair frequencies and the ith order line spectral pair frequencies of the second codewords and (ii) a shift of the difference by an ith frequency shifting factor, wherein N, is greater than or equal to one and less than or equal to P, and P is the highest order line spectral pair frequency of the input signal and the second codewords.

41. The method as in claim 40 wherein the first distance measures, $d(f, \hat{f})$, between the input signal parameters, f, and the reference data parameters, $\hat{f}$, is defined by:

$$d(f, \hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f, \hat{f})$, $f_i$ and $\hat{f}_i$ are the ith line spectral pair frequency parameters in the input signal and the respective first codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal; and
   the second distance measures, $d(f, \hat{f})$, between the input signal parameters, f and the reference data parameters, $\hat{f}$, is defined by:

$$d(f, \hat{f}) = \sum_{i=1}^{Ni} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f,\hat{f})$, $f_i$ and $\hat{f}_i$ are the ith line spectral pair frequency parameters in the input signal and the respective second codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal.

42. The apparatus as in claim 41 wherein the constants $\alpha_1$, $\alpha_2$, $\beta_1$ and $\beta_2$ are set to substantially minimize quantization error.

43. A method of recognizing speech comprising the steps of:
   receiving an input signal;
   determining P order line spectral pairs for TO frames of the input signal, wherein P and TO are integers;
   vector quantizing the P order line spectral pairs for each of the TO frames;

classifying the input signal using the vector quantization of the P order line spectral pairs;

matrix quantizing the P order line spectral pairs for T matrices of frames of the input signal, wherein T is defined as int(TO/N), and N is the number for input signal frames represented in each of the T matrices;

classifying the input signal using the matrix quantization of the P order line spectral pairs;

combining the classifications of the input signal to generate a combination of the classifications; and recognizing the input signal as particular speech from the combination of the classifications.

44. The method as in claim 43 wherein:

vector quantizing the P order line spectral pairs comprises:
  determining a first distance measure between an ith line spectral pair frequency of the input signal and respective ith order line spectral pair frequencies of a plurality of first codewords, wherein the distance measure, for i=1 to $N_1$, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to P, and P is the highest order line spectral pair frequency of the input signal and the first codewords;

matrix quantizing the P order line spectral pairs comprises:
  determining a second distance measure between an ith line spectral pair frequency of the input signal and respective ith order line spectral pair frequencies of a plurality of second codewords, wherein the distance measure, for i=1 to $N_1$, is proportional to (i) a difference between the ith input signal line spectral pair frequencies and the ith order line spectral pair frequencies of the second codewords and (ii) a shift of the difference by an ith frequency shifting factor, wherein N, is greater than or equal to one and less than or equal to P, and P is the highest order line spectral pair frequency of the input signal and the second codewords;

the first distance measures, $d(f, \hat{f})$, between the input signal parameters, f and the reference data parameters, $\hat{f}$, is defined by:

$$d(f, \hat{f}) = \sum_{i=1}^{Ni} \alpha_1 \left[ (f_i - e_i^{\beta_1} - \hat{f}_i) \right]^2 + \sum_{i=N_1+1}^{P} \alpha_2 \left[ (f_i - \hat{f}_i) e_i^{\beta_2} \right]^2$$

wherein d (f, $\hat{f}$), $f_i$ and $\hat{f}_i$ are the ith line spectral pair frequency parameters in the input signal and the respective first codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal; and the second distance measures, $d(f, \hat{f})$, between the input signal parameters, f and the reference data parameters, $\hat{f}$, is defined by:

$$d(f, \hat{f}) = \sum_{i=1}^{Ni} \alpha_1 \left[ (f_i - e_i^{\beta_1} - \hat{f}_i) \right]^2 + \sum_{i=N_1+1}^{P} \alpha_2 \left[ (f_i - \hat{f}_i) e_i^{\beta_2} \right]^2$$

wherein $d(f, \hat{f})$, $f_i$ and $\hat{f}_i$ are the ith line spectral pair frequency parameters in the input signal and the respective second codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal.

* * * * *

UNITED STATES PATENT AND TRADEMARK OFFICE
CERTIFICATE OF CORRECTION

PATENT NO.     : 6,070,136
ISSUE DATE     : May 30, 2000
INVENTOR(S)    : Asghar, Safdar M.; Cong, Lin It is certified that error appears in the above-identified patent and that said Letters Patent is hereby corrected as shown below:

Col. 19, line 60, delete "N," and insert -$N_1$-.
Col. 20, line 28, delete "N," and insert -$N_1$-.
Col. 24, line 6, delete "N," and insert -$N_1$-.
Col. 24, line 37, delete "e;" and insert -$e_i$-.
Col. 25, line 28, delete "fuzz" and insert -fuzzy-.
Col. 26, line 23, delete "n," and insert -$N_1$-.
Col. 28, line 23, after "parameters," insert - -.
Col. 28, line 23, after "$f$", insert -,-.

Signed and Sealed this

Third Day of April, 2001

Attest:

NICHOLAS P. GODICI

Attesting Officer

Acting Director of the United States Patent and Trademark Office